Figure 1A:
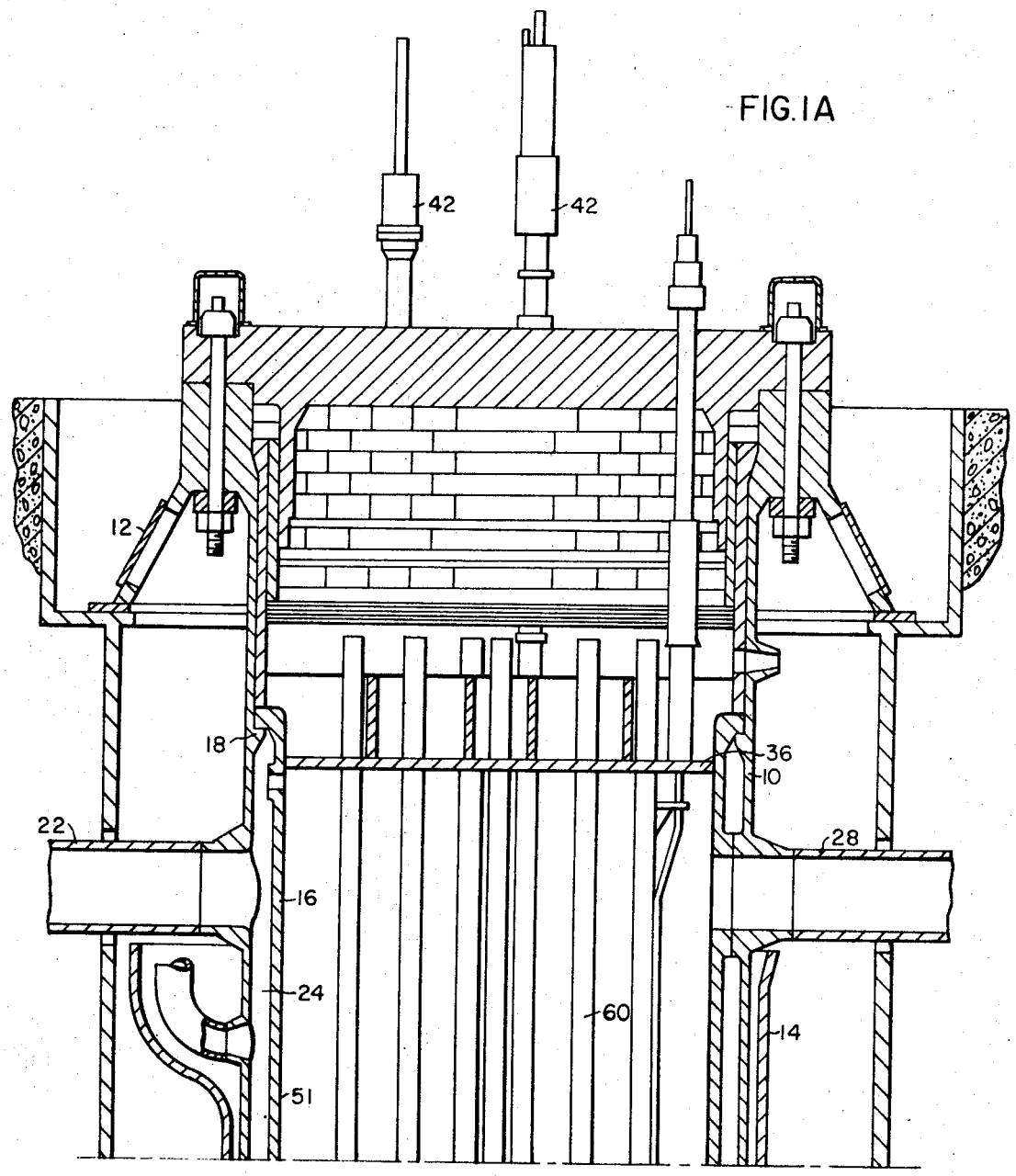
Figure 1B:
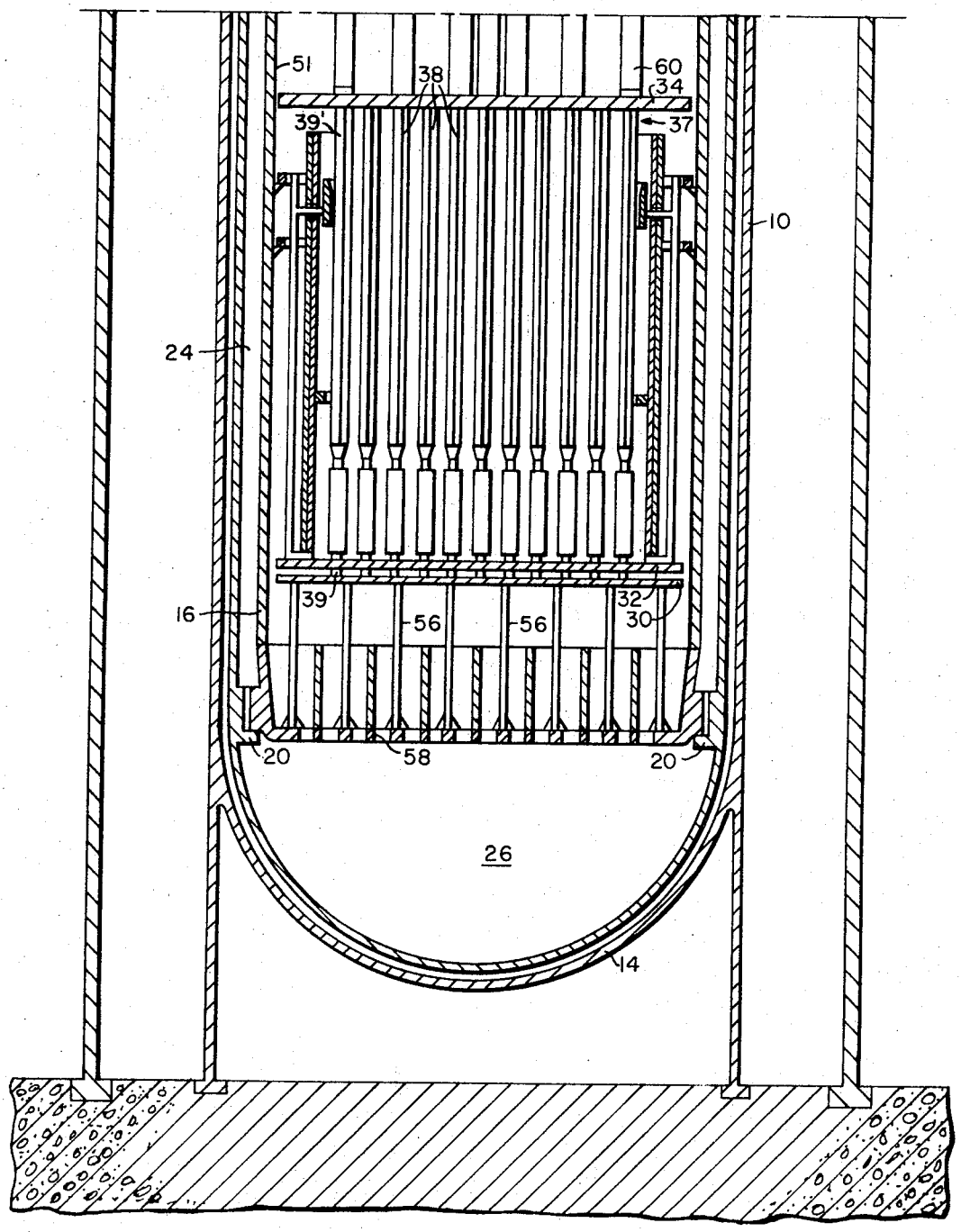
Figure 2:
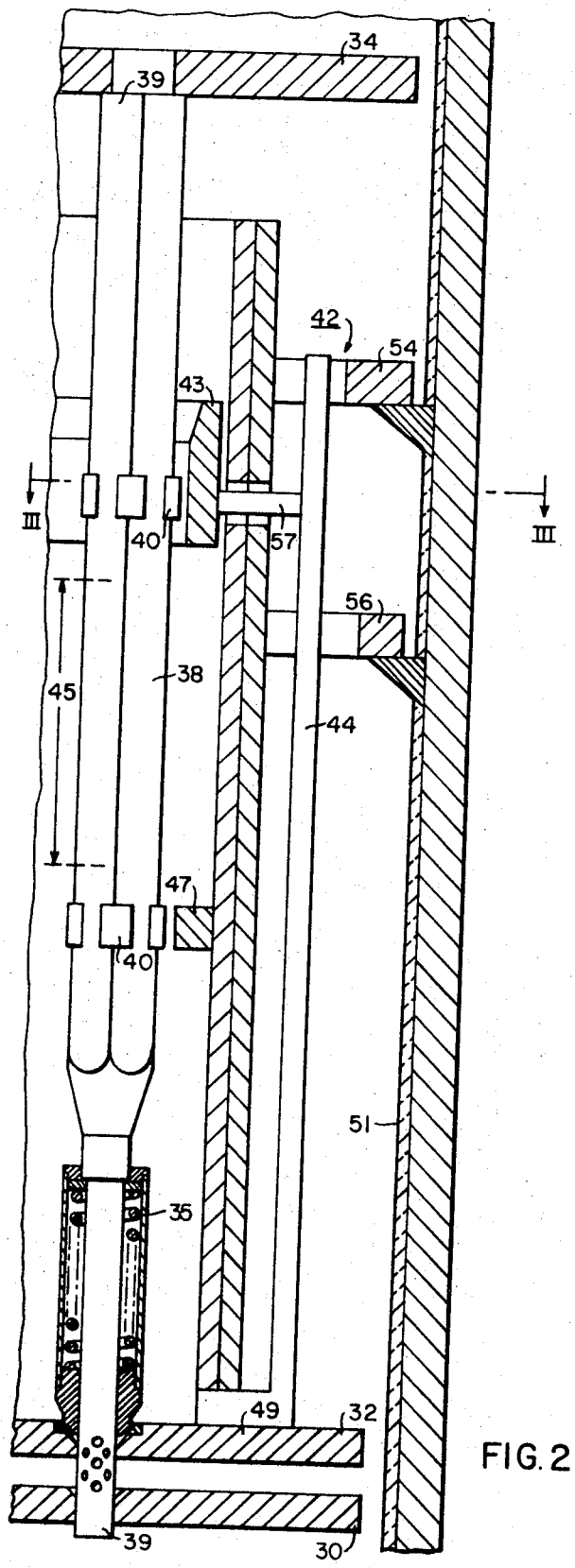
Figure 3:
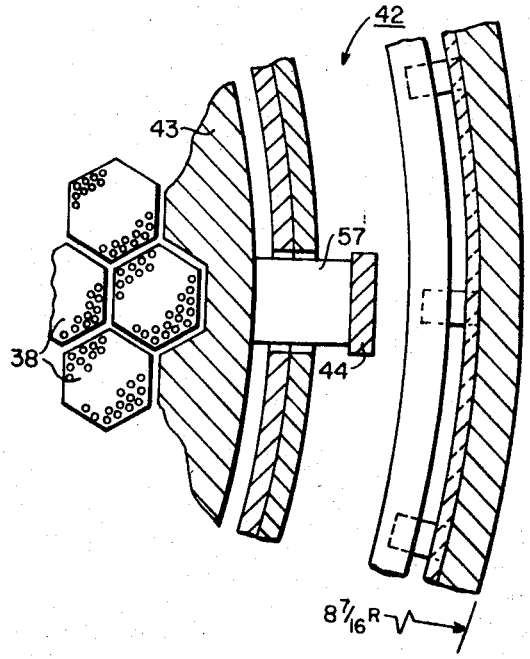

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 26, 1973

911 O.G. 1137

T911,015

NUCLEAR CORE POSITIONING SYSTEM

Hans Dieter Garkisch, Irwin, Howard W. Yant, Greensburg, and John F. Patterson, Murrysville, Pa., assignors to Westinghouse Electric Corporation, Pittsburgh, Pa.

Filed Dec. 21, 1971, Ser. No. 210,447

**Int. Cl. G21c *3/30***

U.S. Cl. 176—85

3 Sheets Drawing. 14 Pages Specification

A structural support system for the core of a nuclear reactor which achieves relatively restricted clearances at operating conditions and yet allows sufficient clearance between fuel assemblies at refueling temperatures. Axially displaced spacer pads having variable between pad spacing and a temperature compensated radial restraint system are utilized to maintain clearances between the fuel elements. The core support plates are constructed of metals specially chosen such that differential thermal expansion produces positive restraint at operating temperatures.

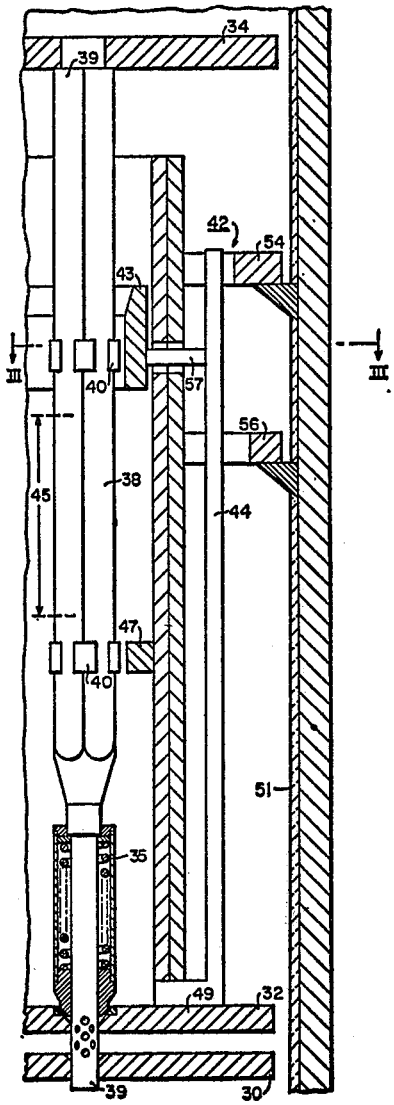

NUCLEAR CORE POSITIONING SYSTEM

Filed Dec. 21, 1971 3 Sheets-Sheet 1

NUCLEAR CORE POSITIONING SYSTEM

Filed Dec. 21, 1971 3 Sheets-Sheet 2

NUCLEAR CORE POSITIONING SYSTEM

Filed Dec. 21, 1971 3 Sheets-Sheet 3